(12) United States Patent
Ota et al.

(10) Patent No.: US 10,161,510 B2
(45) Date of Patent: Dec. 25, 2018

(54) CONTROLLER FOR AUTOMATIC TRANSMISSION

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Keisuke Ota, Toyota (JP); Norihiro Tsukamoto, Toyota (JP); Tomohiro Chimbe, Kariya (JP); Ayumu Sagawa, Toyota (JP); Hiromasa Takai, Anjo (JP); Masataka Hirano, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 10 days.

(21) Appl. No.: 15/656,003

(22) Filed: Jul. 21, 2017

(65) Prior Publication Data

US 2018/0031122 A1 Feb. 1, 2018

(30) Foreign Application Priority Data

Jul. 28, 2016 (JP) .................. 2016-148162

(51) Int. Cl.
*F16H 61/04* (2006.01)
*F16H 61/00* (2006.01)
*F16H 61/30* (2006.01)
*F16H 61/06* (2006.01)
*F16H 61/28* (2006.01)
*F16H 3/66* (2006.01)
*F16H 61/686* (2006.01)

(52) U.S. Cl.
CPC ......... *F16H 61/04* (2013.01); *F16H 61/0021* (2013.01); *F16H 61/0437* (2013.01); *F16H 61/061* (2013.01); *F16H 61/30* (2013.01); *F16H 3/666* (2013.01); *F16H 61/686* (2013.01); *F16H 2061/0444* (2013.01); *F16H 2061/2846* (2013.01); *F16H 2200/006* (2013.01); *F16H 2200/201* (2013.01); *F16H 2200/2046* (2013.01); *F16H 2200/2097* (2013.01); *F16H 2306/14* (2013.01)

(58) Field of Classification Search
CPC .. F16H 61/0021; F16H 61/04; F16H 61/0437; F16H 61/061; F16H 2061/0444; F16H 2061/2846; F16H 2306/14
See application file for complete search history.

(56) References Cited

U.S. PATENT DOCUMENTS

| 6,009,768 A | 1/2000 | Hoshiya et al. |
| 2008/0125267 A1* | 5/2008 | Dourra ................. F16H 61/061 475/123 |
| 2010/0087293 A1 | 4/2010 | MacFarlane et al. |

(Continued)

FOREIGN PATENT DOCUMENTS

JP 2008-215580 A 9/2008

*Primary Examiner* — Edwin A Young
(74) *Attorney, Agent, or Firm* — Oliff PLC

(57) ABSTRACT

When there is a request for a skip downshift that transitionally establishes an intermediate speed position, a surge hydraulic pressure at the start of a torque phase during shift control toward the intermediate speed position is set so as to be lower than a surge hydraulic pressure at the start of a torque phase during shift control toward a required speed position.

5 Claims, 8 Drawing Sheets

(56) References Cited

U.S. PATENT DOCUMENTS

2013/0109533 A1\* 5/2013 Matsubara ............ F16H 61/061
 477/80
2015/0012205 A1\* 1/2015 Sugano ................. B60W 10/06
 701/103

\* cited by examiner

FIG. 3

|   | C1 | C2 | C3 | C4 | B1 | B2 |
|---|----|----|----|----|----|----|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  |  | O |  |
| Rev |  |  | O |  |  | O |

CONTROLLER FOR AUTOMATIC TRANSMISSION

INCORPORATION BY REFERENCE

The disclosure of Japanese Patent Application No. 2016-148162 filed on Jul. 28, 2016 including the specification, drawings and abstract is incorporated herein by reference in its entirety.

BACKGROUND

1. Technical Field

The disclosure relates to a controller for an automatic transmission. More particularly, the disclosure relates to control over a stepped automatic transmission that is able to perform multiple shifts that transitionally establish an intermediate speed position.

2. Description of Related Art

Conventionally, there is known an automatic transmission that establishes one of a plurality of speed positions by selectively engaging a plurality of frictional engagement elements. In an automatic transmission of this type, in order to shorten a shift time and reduce a shift shock, it is required to highly accurately control hydraulic pressure that is supplied to one of the frictional engagement elements (hydraulic pressure that is supplied to an engaging one of the frictional engagement elements) and hydraulic pressure that is discharged from another one of the frictional engagement elements (hydraulic pressure that is discharged from a releasing one of the frictional engagement elements).

Japanese Patent Application Publication No. 2008-215580 (JP 2008-215580 A) describes that, when a condition that indicates a delayed shift is satisfied on the basis of the status of an automatic transmission during power-on downshift, surge hydraulic pressure control is executed. In the surge hydraulic pressure control, a command value corresponding to hydraulic pressure that is supplied to an engaging one of frictional engagement elements is increased in a stepwise manner for a predetermined time. A delay in the response of hydraulic pressure that is supplied to the engaging one of the frictional engagement elements is suppressed through the surge hydraulic pressure control.

SUMMARY

Incidentally, in recent years, there are an increased number of situations in which an automatic transmission performs a skip shift (for example, at the time of a power-on downshift, or the like, a shift from the current speed position to a lower gear-side speed position by two or more steps) due to an increase in the number of speeds of the automatic transmission.

When such a skip shift is performed, the amount of change in the rotation speed of each of intended frictional engagement elements resulting from releasing one of the frictional engagement elements and engaging the other one of the frictional engagement elements increases. As a result, the amount of heat generation due to sliding between the friction materials of each of the frictional engagement elements (hereinafter, which may be referred to as clutch heat generation amount) can increase. In order to reduce the clutch heat generation amount, another speed position (hereinafter, which may be referred to as intermediate speed position) is transitionally established between a speed position before shifting and a required speed position that is required in response to an operation status, such as an acceleration operation amount. That is, multiple shifts that transitionally establish an intermediate speed position are performed.

In performing such multiple shifts that transitionally establish an intermediate speed position, when the surge hydraulic pressure control is applied at the time when the intermediate speed position is transitionally established, a command value corresponding to hydraulic pressure that is supplied to an engaging frictional engagement element at the time when the intermediate speed position is transitionally established (hereinafter, which may also be referred to as intermediate speed position engaging element) is increased. At this time, if hydraulic pressure that is supplied to the intermediate speed position engaging element is set equivalently to hydraulic pressure that is supplied to an engaging frictional engagement element at the time when the required speed position is established (hereinafter, which may also be referred to as required speed position engaging element), the intermediate speed position engaging element can be completely engaged (complete clutch engagement) at the time when the intermediate speed position is transitionally established. In this case, the state where the intermediate speed position is established is temporarily held, and the rate of change in input shaft rotation speed reduces (shift operation stagnates) in the middle of a change in rotation in a series of downshift control (downshift control in a period from the speed position before the start of shifting to the required speed position). Under such circumstances, it is not possible to smoothly perform the multiple shifts, which may lead to an extension of a shift time or deterioration of drivability.

The disclosure provides a controller for an automatic transmission, and a vehicle, which are able to smoothly perform multiple shifts that transitionally establish an intermediate speed position when the multiple shifts are performed.

A first aspect of the disclosure provides a controller for a stepped automatic transmission. The automatic transmission is configured to be able to establish one of a plurality of speed positions by selectively engaging a plurality of frictional engagement elements and, when a power-on downshift is required and when there is a difference in speed position by two or more steps between a current speed position and a required speed position that is required in response to an operation status, perform multiple shifts that transitionally establish an intermediate speed position between the current speed position and the required speed position. The controller includes a surge hydraulic pressure control unit. The surge hydraulic pressure control unit is configured to, at the time when a power-on downshift that performs the multiple shifts that transitionally establish an intermediate speed position is performed, control a surge hydraulic pressure that is supplied to each engaging frictional engagement element in order to increase response of the engaging frictional engagement element. Each engaging frictional engagement element is controlled from a released state toward an engaged state in each of the shifts. The surge hydraulic pressure control unit is configured to set a surge hydraulic pressure for the engaging frictional engagement element that is operated when the intermediate speed position is transitionally established such that the surge hydraulic pressure for the engaging frictional engagement element that is operated when the intermediate speed position is transitionally established is lower than a surge hydraulic pressure for the engaging frictional engagement element that is operated when the required speed position is established.

With this configuration, at the time when a power-on downshift that performs multiple shifts that transitionally establish an intermediate speed position is performed, the surge hydraulic pressure control unit sets the surge hydraulic pressure for the engaging frictional engagement element that is operated when the intermediate speed position is transitionally established such that the surge hydraulic pressure for the engaging frictional engagement element that is operated when the intermediate speed position is transitionally established is lower than the surge hydraulic pressure for the engaging frictional engagement element that is operated when the required speed position is established. Thus, it is possible to prevent the engaging frictional engagement element that is operated when the intermediate speed position is transitionally established from being completely engaged (completing clutch engagement), so it is possible to prevent a reduction in the rate of change in input shaft rotation speed (stagnation of shift operation) in the middle of a change in rotation in a series of downshift control (downshift control from the speed position before the start of shifting (current speed position) to the required speed position). As a result, it is possible to smoothly perform multiple shifts that transitionally establish an intermediate speed position, so it is possible to suppress an extension of shift time, and it is possible to suppress deterioration of drivability. On the other hand, since the surge hydraulic pressure for the engaging frictional engagement element that is operated when the required speed position is established is set to a higher value, the response of the engaging frictional engagement element at this time is increased. As a result, the engaging frictional engagement element is early completely engaged (complete clutch engagement) when the required speed position is established. For this reason, it is possible to prevent the input shaft rotation speed from becoming higher than the synchronous rotation speed of the required speed position (racing of the input shaft rotation speed).

The surge hydraulic pressure control unit may be configured to, when the intermediate speed position is transitionally established, start supplying the surge hydraulic pressure at the time when a transmission input shaft rotation speed reaches a rotation speed close to a synchronous rotation speed of the intermediate speed position and a torque phase is started, the torque phase is a phase in which a releasing frictional engagement element and the engaging frictional engagement element that are operated when the intermediate speed position is transitionally established are respectively released and engaged, and the surge hydraulic pressure control unit may be configured to, when the required speed position is established, start supplying the surge hydraulic pressure at the time when the transmission input shaft rotation speed reaches a rotation speed close to a synchronous rotation speed of the required speed position and a torque phase is started, the torque phase is a phase in which a releasing frictional engagement element and the engaging frictional engagement element that are operated when the required speed position is established are respectively released and engaged.

Thus, the surge hydraulic pressure at the start of torque phase control when the intermediate speed position is transitionally established is set to a lower value, so it is possible to prevent the engaging frictional engagement element from being completely engaged. For this reason, it is possible to prevent a reduction in the rate of change in input shaft rotation speed in the middle of a change in rotation in a series of downshift control. On the other hand, the surge hydraulic pressure at the start of torque phase control when the required speed position is established is set to a higher value, so the engaging frictional engagement element is early completely engaged. Thus, it is possible to suppress racing of the input shaft rotation speed.

The surge hydraulic pressure control unit may be configured to, when the engaging frictional engagement element that is operated when the intermediate speed position is transitionally established remains engaged in a target speed position subsequent to the intermediate speed position, set an engaging surge hydraulic pressure for the surge hydraulic pressure for the engaging frictional engagement element that is operated when the intermediate speed position is transitionally established, and the surge hydraulic pressure control unit may be configured to, when the engaging frictional engagement element that is operated when the intermediate speed position is transitionally established is released in a target speed position subsequent to the intermediate speed position, set a releasing surge hydraulic pressure different from the engaging surge hydraulic pressure for the surge hydraulic pressure for the engaging frictional engagement element that is operated when the intermediate speed position is transitionally established.

Thus, in a target speed position subsequent to the intermediate speed position, the surge hydraulic pressure for the engaging frictional engagement element that is operated when the intermediate speed position is transitionally established is changed in response to whether the engaging frictional engagement element (engaging frictional engagement element that is operated when the intermediate speed position is transitionally established) remains engaged or is released. For this reason, it is possible to set an appropriate surge hydraulic pressure commensurate with a target speed position subsequent to the intermediate speed position, so it is possible to smoothly perform a shift to the target speed position subsequent to the intermediate speed position.

According to the aspects of the disclosure, at the time when a power-on downshift that performs multiple shifts that transitionally establish an intermediate speed position is performed, the surge hydraulic pressure for the engaging frictional engagement element that is operated when the intermediate speed position is transitionally established is set so as to be lower than the surge hydraulic pressure for the engaging frictional engagement element that is operated when the required speed position is established. Thus, it is possible to prevent a reduction in the rate of change in input shaft rotation speed in the middle of a change in rotation in downshift control from a speed position before the start of shifting (current speed position) to the required speed position, so it is possible to smoothly perform multiple shifts that transitionally perform the intermediate speed position. When the required speed position is established, the surge hydraulic pressure is set to a higher value, so the engaging frictional engagement element is early completely engaged. As a result, it is possible to prevent racing of the input shaft rotation speed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is an operation chart that shows the engagement statuses of first to fourth clutches and first and second brakes in each speed position in the automatic transmission;

DETAILED DESCRIPTION OF EMBODIMENTS

Hereinafter, an embodiment of the disclosure will be described with reference to the accompanying drawings.

Initially, a vehicle 100 according to the present embodiment will be described with reference to FIG. 1 to FIG. 4.

Figure 1:
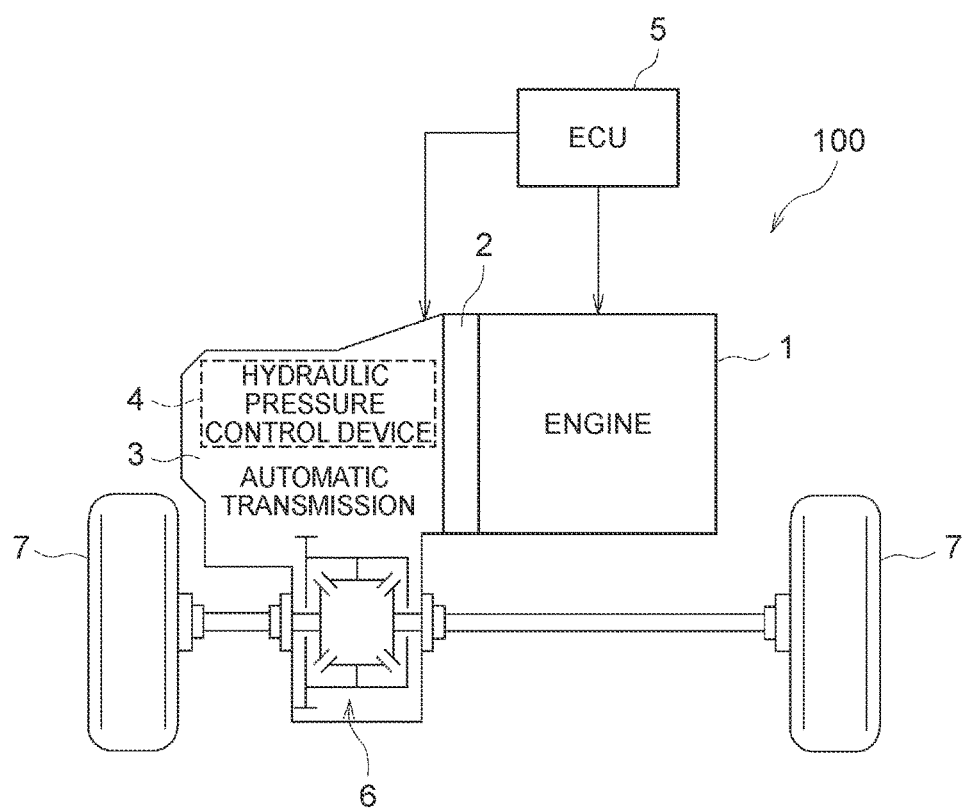
FIG. 1 is a view that shows the schematic configuration of a drive system of a vehicle according to an embodiment.

As shown in FIG. 1, the vehicle 100 includes an engine 1, a torque converter 2, an automatic transmission 3, a hydraulic pressure control device 4 and an ECU 5. The vehicle 100 is of, for example, a front-engine front-drive (FF) type. The output of the engine 1 is transmitted to a differential unit 6 via the torque converter 2 and the automatic transmission 3, and is then distributed to right and left drive wheels (front wheels) 7.

The engine (internal combustion engine) 1 is a driving force source for propelling the vehicle 100, and is, for example, a multi-cylinder gasoline engine. The engine 1 is configured such that the operation status is controllable through a throttle opening degree (intake air amount) of a throttle valve, a fuel injection amount, ignition timing, and the like.

Figure 2:
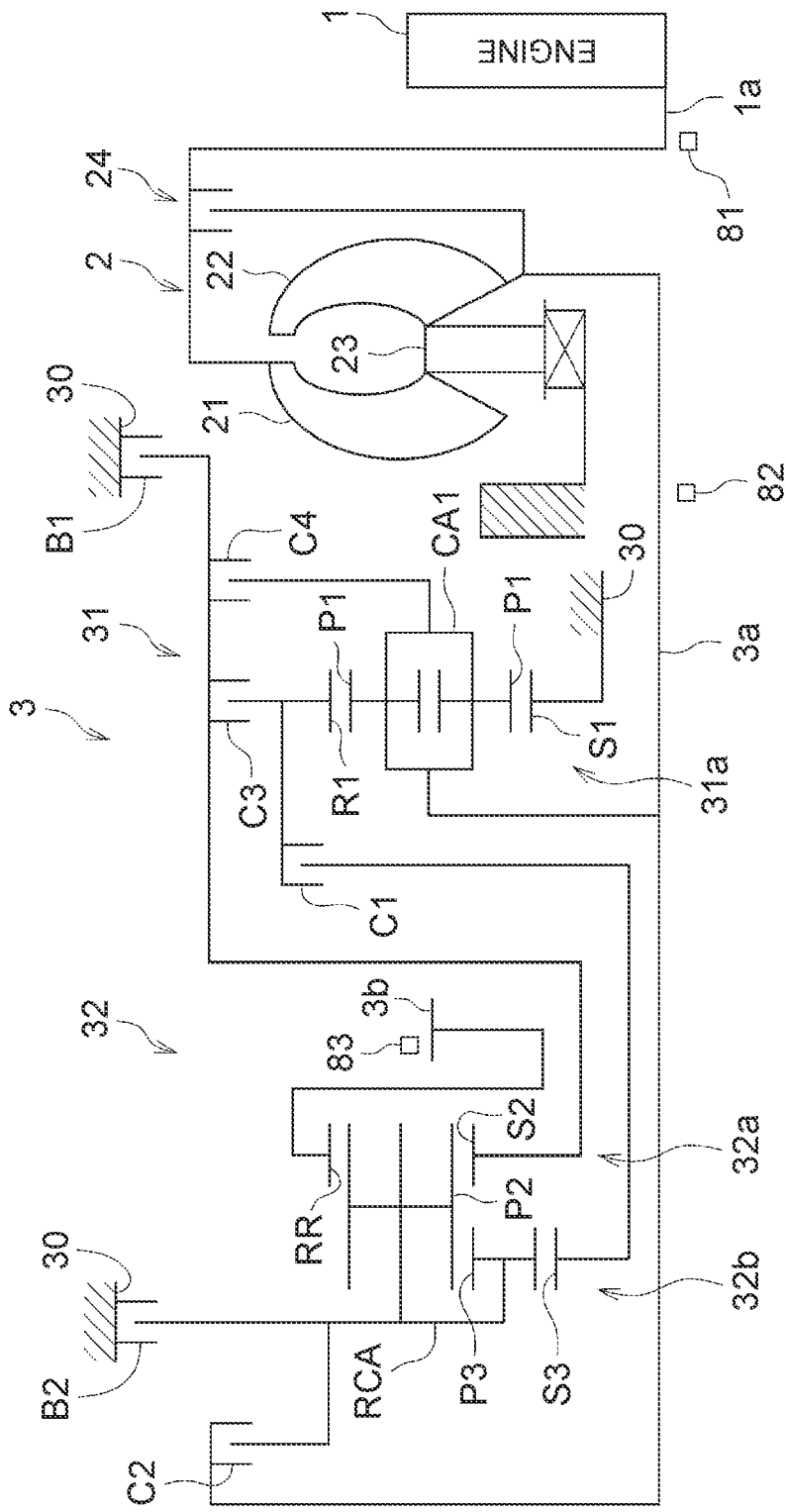
FIG. 2 is a skeletal view that shows the configuration of a torque converter and automatic transmission.

As shown in FIG. 2, the torque converter 2 includes a pump impeller 21, a turbine runner 22, a stator 23 and a lockup clutch 24. The pump impeller 21 is coupled to a crankshaft 1a that is the output shaft of the engine 1. The turbine runner 22 is coupled to the automatic transmission 3. The stator 23 has a torque amplification function. The lockup clutch 24 is used to directly couple the engine 1 to the automatic transmission 3. FIG. 2 schematically shows only the upper half of the torque converter 2 and automatic transmission 3 and does not show the lower half of the torque converter 2 and automatic transmission 3 with respect to the rotation central axes of the torque converter 2 and automatic transmission 3.

The automatic transmission 3 is provided in the power transmission path between the engine 1 and the drive wheels 7. The automatic transmission 3 is configured to change the speed of rotation of an input shaft 3a and then output the rotation to an output shaft 3b. The input shaft 3a of the automatic transmission 3 is coupled to the turbine runner 22 of the torque converter 2. The output shaft 3b of the automatic transmission 3 is coupled to the drive wheels 7 via the differential unit 6, and the like.

The automatic transmission 3 includes a first transmission unit (front planetary unit) 31, a second transmission unit (rear planetary unit) 32, first to fourth clutches C1 to C4, a first brake B1, a second brake B2, and the like. The first transmission unit 31 is mainly constituted of a first planetary gear 31a. The second transmission unit 32 is mainly constituted of a second planetary gear 32a and a third planetary gear 32b.

The first planetary gear 31a that constitutes the first transmission unit 31 is a double pinion planetary gear set. The first planetary gear 31a includes a sun gear S1, a plurality of pairs of mutually meshing pinion gears P1, a planetary carrier CA1 and a ring gear R1. The planetary carrier CA1 supports the pinion gears P1 such that each of the pinion gears P1 is rotatable and revolvable. The ring gear R1 is in mesh with the sun gear S1 via the pinion gears P1.

The planetary carrier CA1 is coupled to the input shaft 3a, and rotates integrally with the input shaft 3a. The sun gear S1 is fixed to a transmission case 30, and is non-rotatable. The ring gear R1 functions as an intermediate output member. The ring gear R1 reduces the speed of rotation from the input shaft 3a and then transmits the rotation reduced in speed to the second transmission unit 32.

The second planetary gear 32a that constitutes the second transmission unit 32 is a single pinion planetary gear set. The second planetary gear 32a includes a sun gear S2, pinion gears P2, a planetary carrier RCA and a ring gear RR. The planetary carrier RCA supports the pinion gears P2 such that each of the pinion gears P2 is rotatable and revolvable. The ring gear RR is in mesh with the sun gear S2 via the pinion gears P2.

The third planetary gear 32b that constitutes the second transmission unit 32 is a double pinion planetary gear set. The third planetary gear 32b includes a sun gear S3, a plurality of pairs of mutually meshing pinion gears P2, P3, the planetary carrier RCA and the ring gear RR. The planetary carrier RCA supports the pinion gears P2, P3 such that each of the pinion gears P2, P3 is rotatable and revolvable. The ring gear RR is in mesh with the sun gear S3 via the pinion gears P2, P3. The planetary carrier RCA and the ring gear RR are shared between the second planetary gear 32a and the third planetary gear 32b.

The sun gear S2 is selectively coupled to the transmission case 30 by the first brake B1. The sun gear S2 is selectively coupled to the ring gear R1 via the third clutch C3. The sun gear S2 is selectively coupled to the planetary carrier CA1 via the fourth clutch C4. The sun gear S3 is selectively coupled to the ring gear R1 via the first clutch C1. The planetary carrier RCA is selectively coupled to the transmission case 30 by the second brake B2. The planetary carrier RCA is selectively coupled to the input shaft 3a via the second clutch C2. The ring gear RR is coupled to the output shaft 3b, and rotates integrally with the output shaft 3b.

Each of the first to fourth clutches C1 to C4, the first brake B1 and the second brake B2 is a frictional engagement element that is frictionally engaged by a hydraulic actuator, and is controlled by the hydraulic pressure control device 4 and the ECU 5.

FIG. 3 is an operation chart that shows the engaged state or released state of each of the first to fourth clutches C1 to C4, first brake B1 and second brake B2 in each speed position (gear position). In the operation chart of FIG. 3, the circle mark indicates "engaged state", and the blank indicates "released state".

As shown in FIG. 3, in the automatic transmission 3 of this example, when the first clutch C1 and the second brake B2 are engaged, a first speed position (1st) is established. In the first speed position, a speed ratio (Rotation speed of the input shaft 3a/Rotation speed of the output shaft 3b) is the largest. When the first clutch C1 and the first brake B1 are engaged, a second speed position (2nd) is established.

When the first clutch C1 and the third clutch C3 are engaged, a third speed position (3rd) is established. When the first clutch C1 and the fourth clutch C4 are engaged, a fourth speed position (4th) is established. When the first clutch C1 and the second clutch C2 are engaged, a fifth speed position (5th) is established. When the second clutch C2 and the fourth clutch C4 are engaged, a sixth speed position (6th) is established. When the second clutch C2 and the third clutch C3 are engaged, a seventh speed position (7th) is established. When the second clutch C2 and the first brake B1 are engaged, an eighth speed position (8th) is established. When the third clutch C3 and the second brake B2 are engaged, a reverse position (Rev) is established.

In this way, the automatic transmission 3 is configured to establish one of the plurality of speed positions by selectively engaging any two of the plurality of frictional engagement elements.

The hydraulic pressure control device 4 is provided in order to control the status of (whether to engage or release) each of the frictional engagement elements of the automatic transmission 3. The hydraulic pressure control device 4 also has the function of controlling the lockup clutch 24 of the torque converter 2.

Figure 4:
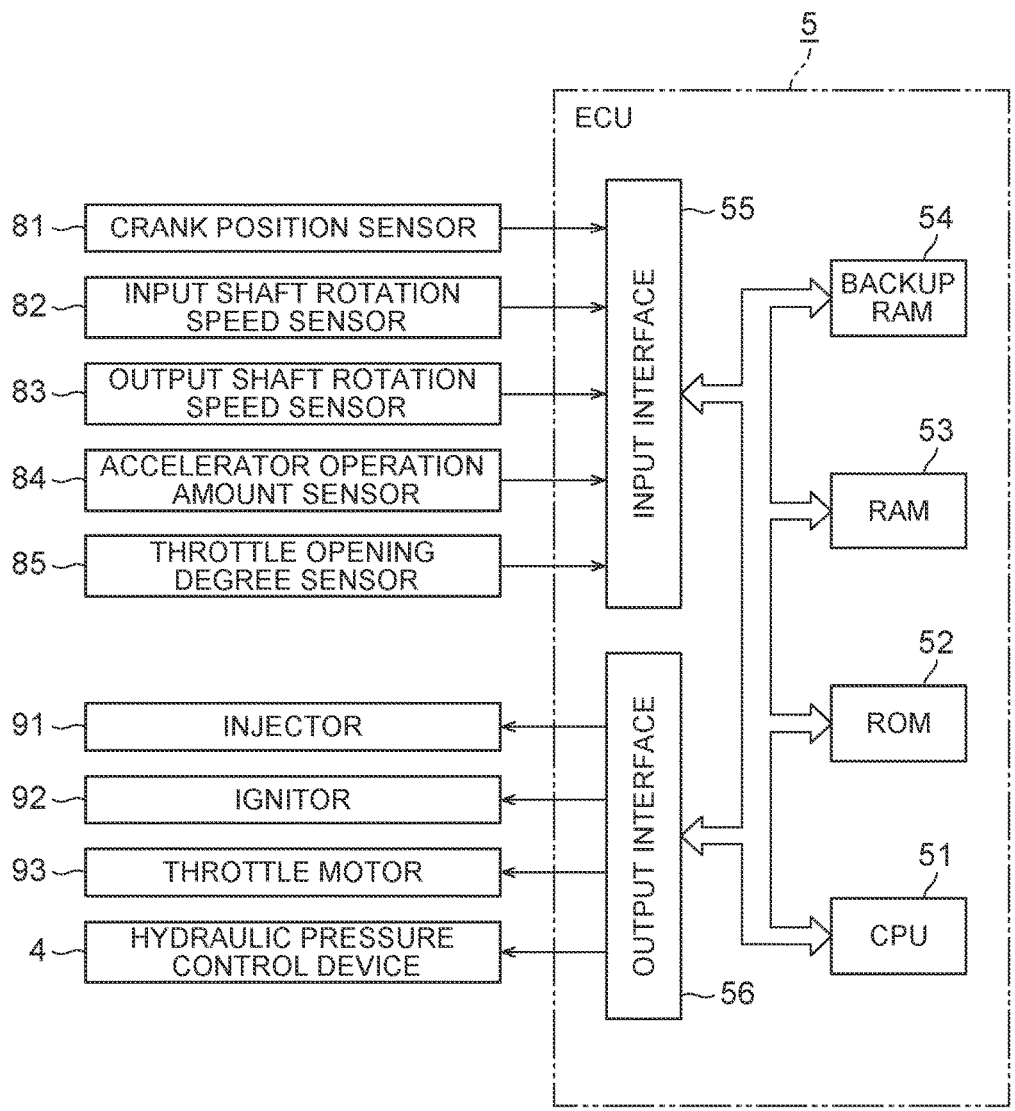
FIG. 4 is a block diagram that shows the configuration of a control system of the vehicle.

The ECU 5 is configured to control the operation of the engine 1, the shift of the automatic transmission 3, and the like. Specifically, as shown in FIG. 4, the ECU 5 includes a CPU 51, a ROM 52, a RAM 53, a backup RAM 54, an input interface 55 and an output interface 56. The ECU 5 is an example of a controller according the aspects of the disclosure.

The CPU 51 executes arithmetic processing on the basis of various control programs and maps stored in the ROM 52. The ROM 52 stores various control programs, maps, and the like. The maps are referenced when those various control programs are executed. The RAM 53 is a memory that temporarily stores computed results of the CPU 51, detected results of sensors, and the like. The backup RAM 54 is a nonvolatile memory that stores data, and the like, to be saved at the time when the ignition is turned off.

A crank position sensor 81, an input shaft rotation speed sensor 82, an output shaft rotation speed sensor 83, an accelerator operation amount sensor 84, a throttle opening degree sensor 85, and the like, are connected to the input interface 55.

The crank position sensor 81 is provided in order to calculate the rotation speed of the engine 1. The input shaft rotation speed sensor 82 is provided in order to calculate the rotation speed of the input shaft 3a (input shaft rotation speed; turbine rotation speed) of the automatic transmission 3. The output shaft rotation speed sensor 83 is provided in order to calculate the rotation speed of the output shaft 3b (output shaft rotation speed) of the automatic transmission 3. It is possible to calculate a vehicle speed on the basis of the output shaft rotation speed. The accelerator operation amount sensor 84 is provided in order to detect an accelerator operation amount that is the depression amount (operation amount) of an accelerator pedal. The throttle opening degree sensor 85 is provided in order to detect the throttle opening degree of the throttle valve.

An injector 91, an ignitor 92, a throttle motor 93, the hydraulic pressure control device 4, and the like, are connected to the output interface 56. The injector 91 is a fuel injection valve, and is able to regulate the fuel injection amount. The ignitor 92 is provided in order to regulate the ignition timing of an ignition plug. The throttle motor 93 is provided in order to regulate the throttle opening degree of the throttle valve.

The ECU 5 is configured to be able to control the operation status of the engine 1 by controlling the throttle opening degree, the fuel injection amount, the ignition timing, and the like, on the basis of detected results of the sensors, and the like. The ECU 5 is configured to be able to control the shift of the automatic transmission 3 and control the lockup clutch 24 of the torque converter 2 by controlling the hydraulic pressure control device 4.

In the shift control by the ECU 5, for example, a required speed position is set on the basis of a shift map that uses a vehicle speed and an accelerator operation amount as parameters, and the hydraulic pressure control device 4 is controlled such that an actual speed position becomes the required speed position.

Before characterized control (surge hydraulic pressure control) of the present embodiment is described, the outline of shift control for determining controlled operation amounts that achieve shift target values in the above-described automatic transmission 3 will be described.

As for general shift control, there is, for example, a technique for determining the torque capacity (or hydraulic pressure command value) of each of the frictional engagement elements during shifting on the basis of a predetermined control map through adaptation while evaluating whether a shift shock, a shift time, and the like, are appropriate in an actual vehicle and then performing a shift. With this technique that uses the control map, a large number of control maps need to be prepared in accordance with a shift pattern, such as a power-on downshift and a power-off upshift, and a combination of a speed position before shifting and a speed position after shifting. For this reason, as the number of speeds of an automatic transmission is increased, much effort is required for adaptation work.

Therefore, the present embodiment employs a technique for performing a shift with the use of a shift model that determines controlled operation amounts for achieving shift target values as shift control instead of the technique that uses the control map. The shift target values are target values of factors (such as a shift time and a driving force) that determine an intended mode of change during shifting. The controlled operation amounts are required values of factors (such as an engine torque and a clutch torque) that are operated for controlled objects.

Hereinafter, shift control that uses a shift model will be described. The equation of motion during shifting is expressed by the following mathematical expressions (1) and (2).

$$d\omega t/dt = a1 \cdot Tt + b1 \cdot Tcapl + c1 \cdot Tcdrn + d1 \cdot d\omega o/dt \quad (1)$$

$$To = a2 \cdot Tt + b2 \cdot Tcapl + c2 \cdot Tcdrn + d2 \cdot d\omega o/dt \quad (2)$$

These mathematical expressions (1) and (2) are derived from the equation of motion of each of mutually coupled rotating elements that constitute the automatic transmission 3 and a relational expression in each of the planetary gears that constitute the automatic transmission 3. The equation of motion of each of the rotating elements is such an equation of motion that a torque that is expressed by a product of an inertia in each of the rotating elements and a time rate of change in rotation speed is defined as a torque that acts on a member associated with each of the rotating elements among the three members of each of the planetary gears and members at both sides of each of the frictional engagement elements. The relational expression in each of the planetary gears is such a relational expression that a relation in torque among the three members of each of the planetary gears and a relation in the time rate of change in rotation speed each are defined by using the gear ratio of a corresponding one of the planetary gears.

In the mathematical expressions (1) and (2), dωt/dt is a time derivative, that is, time rate of change, of a turbine rotation speed (rotational angular velocity) ωt (that is, transmission input shaft rotation speed ωi), and denotes the acceleration (angular acceleration; hereinafter, which may be referred to as input shaft acceleration) of the input shaft 3*a* as the amount of change in the speed of the input shaft 3*a*-side rotating member. dωo/dt is a time rate of change in transmission output shaft rotation speed ωo, and denotes an output shaft acceleration. Tt denotes a turbine torque, that is, a transmission input torque Ti, which is the torque of the input shaft 3*a* as the torque of the input shaft 3*a*-side rotating member. When a torque ratio t of the torque converter 2 is considered, the turbine torque Tt is synonymous with an engine torque Te (=Tt/t). To denotes a transmission output torque that is the torque of the output shaft 3*b* as the torque of an output shaft 3*b*-side rotating member. Tcapl is the torque capacity (hereinafter, referred to as engaging clutch torque) of the frictional engagement element that performs engaging operation during shifting. Tcdrn is the torque capacity (hereinafter, referred to as releasing clutch torque) of the frictional engagement element that performs releasing operation during shifting. a1, a2, b1, b2, c1, c2, d1, d2 each are a constant at the time when the mathematical expressions (1) and (2) are derived, and are coefficients that are determined by design on the basis of an inertia in each of the rotating elements and the gear ratio of each of the planetary gears. Specific numeric values of these constants depend on, for example, each of types of shift (for example, a shift pattern and a combination of a speed position before shifting and a shift positon after shifting). Therefore, although the equation of motion is one predetermined equation of motion, the equation of motion corresponding to each of the types of shift, in which constants vary depending on each of the types of shift, is used to shift the automatic transmission 3.

The mathematical expressions (1) and (2) express the equation of motion of the gear train of the automatic transmission 3, and formulate the relation between shift target values and controlled operation amounts. Shift target values are allowed to represent a target value of a shift time and a target value of a driving force, and are allowed to be used in the equation of motion of the gear train. In the present embodiment, the input shaft acceleration dωt/dt is used as an example of a physical quantity that represents a shift time. In addition, the transmission output torque To is used as an example of a physical quantity that represents a driving force. That is, in the present embodiment, two values, that is, the input shaft acceleration dωt/dt and the transmission output torque To, are set as the shift target values.

On the other hand, in the present embodiment, three values, that is, the turbine torque Tt (which is synonymous with the engine torque Te), the engaging clutch torque Tcapl and the releasing clutch torque Tcdrn, are set as the controlled operation amounts for establishing the shift target values. Since there are three controlled operation amounts for the fact that the equation of motion is composed of two mathematical expressions, that is, the mathematical expressions (1) and (2), it is not possible to uniquely determine the controlled operation amounts for achieving the two shift target values. The output shaft acceleration dωo/dt in each of the mathematical expressions is calculated on the basis of the transmission output shaft rotation speed ωo that is a detected value of the output shaft rotation speed sensor 83.

Further consideration was made to uniquely determine the controlled operation amounts by adding a constraint to the equation of motion composed of the mathematical expressions (1) and (2). In the present embodiment, torque shares of transmission torque shared between a releasing clutch and an engaging clutch are used as a constraint that is suitable for representing and controlling an exchange of torque during shifting and that is compatible with any shift pattern. That is, the torque shares of transmission torque are set as a constraint. The torque shares of transmission torque allow an exchange of torque during shifting to be incorporated into the equation of motion, and allow the controlled operation amounts to be uniquely determined. The torque shares are the proportions of transmission torque shared between the releasing clutch and the engaging clutch during shifting of the automatic transmission 3 with respect to the torque of the input shaft 3*a* (input shaft total transmission torque) when the total of transmission torque (total transmission torque) that needs to be shared between both the frictional engagement elements is converted to the input shaft total transmission torque. In the present embodiment, where the torque share of the engaging clutch is denoted by xapl and the torque share of the releasing clutch is denoted by xdrn, the torque shares are respectively defined by the following mathematical expressions (3) and (4) by using a torque share x (for example, 0≤x≤1) that varies in time sequence so as to reflect an exchange of torque during shifting.

$$xapl = x \quad (3)$$

$$xdrn = 1 - x \quad (4)$$

The relational expression between the engaging clutch torque Tcapl and the releasing clutch torque Tcdrn may be defined by using "x" (=xapl) and "1−x" (=xdrn) on the basis of Tcapl and Tcdrn, which are converted as torques of the input shaft 3*a*, and the mathematical expressions (3) and (4). From the mathematical expressions (1) and (2) and the relational expression between Tcapl and Tcdrn, relational expressions for calculating the turbine torque Tt, the engaging clutch torque Tcapl and the releasing clutch torque Tcdrn that are the controlled operation amounts are derived. The turbine torque Tt (which is synonymous with the engine torque Te) is expressed by a relational expression that uses "x" (=xapl), "1−x" (=xdrn), the input shaft acceleration dωt/dt, the transmission output torque To, and the like. Similarly, the engaging clutch torque Tcapl is expressed by a relational expression that uses "x" (=xapl), the input shaft acceleration dωt/dt, the transmission output torque To, and the like. Similarly, the releasing clutch torque Tcdrn is expressed by a relational expression that uses "1−x" (=xdrn), the input shaft acceleration dωt/dt, the transmission output torque To, and the like.

That is, the shift model according to the present embodiment is to calculate the controlled operation amounts on the basis of the shift target values by using the equation of motion (the above-described mathematical expressions (1) and (2) of the automatic transmission 3, including the shift target values and the controlled operation amounts, and the relations (the above-described mathematical expressions (3) and (4)) that respectively express the torque shares. In this way, in the present embodiment, by adding the constraint set by the torque share x to the mathematical expressions (1) and (2), the shift of the automatic transmission 3 is performed with the use of the shift model. Thus, even when there are three controlled operation amounts for two shift target values, it is possible to appropriately determine the three controlled operation amounts with the use of the shift model. The shift model is a predetermined one, and the equation of motion of the gear train having different constants for each of the types of shift (for example, a shift pattern and a combination of a speed position before shifting and a speed position after shifting) as described above is used, so the shift model corresponding to each of the types of shift is used to shift the automatic transmission 3.

Next, surge hydraulic pressure control that is the characterized portion of the present embodiment will be described. The surge hydraulic pressure control is executed when a skip downshift that transitionally establishes an intermediate speed position (particularly, a power-on skip downshift that transitionally establishes an intermediate speed position) is performed.

The skip downshift is control for shifting from the current speed position to a lower gear-side speed position by two or more steps, for example, at the time of a power-on downshift (control in the case where there is a difference in speed position by two or more steps between the current speed position and a required speed position that is required in response to an operation status). For example, this is the case where the depression amount of the accelerator pedal increases while traveling in the fifth speed position, the required speed position is set to the second speed position and then a shift is performed or the case where the depression amount of the accelerator pedal increases while traveling in the eighth speed position, the required speed position is set to the third speed position and then a shift is performed.

In the automatic transmission 3 having a large number of speeds like the present embodiment, the amount of change between a speed ratio before shifting and a speed ratio after shifting tends to increase. The shift can be achieved by releasing the engaged frictional engagement element and engaging the released frictional engagement element in the pair of frictional engagement elements (so-called clutch-to-clutch shift). In this case, the amount of change in the rotation speed of each frictional engagement element increases as one of the frictional engagement elements is released and the other is engaged, with the result that the amount of heat generation (clutch heat generation amount) due to sliding between the friction materials of each of the frictional engagement elements increases.

A method of ensuring the durability of each of the frictional engagement elements (particularly, the durability of each of the friction materials) by suppressing an increase in the temperature of each of the frictional engagement elements includes reducing a transmission torque during shifting (for example, torque reduction control over the engine 1, or the like). However, in this case, there is a possibility of a decrease in driving force during shifting or an increase in fluctuations of driving force after shifting, leading to deterioration of drivability. Another method of ensuring the durability includes increasing the thermal capacity of each of the frictional engagement elements. However, this leads to an increase in the size of each of the frictional engagement elements. This results in an increase in the size and weight of the automatic transmission 3, an increase in manufacturing cost, deterioration of power transmission efficiency, and the like.

In order to solve these inconveniences, when there is a skip downshift request, a shift from a speed position before shifting to a required speed position set on the basis of the shift map is performed via another speed position (intermediate speed position). That is, multiple shifts that transitionally establish an intermediate speed position are performed.

The surge hydraulic pressure control is control for temporarily supplying high hydraulic pressure (surge hydraulic pressure) to an engaging frictional engagement element in order to suppress a delay in the response of hydraulic pressure that is supplied to the engaging frictional engagement element when the shift of the automatic transmission 3 is performed. For example, at the time of a power-on downshift, high hydraulic pressure is temporarily supplied to the engaging frictional engagement element as surge hydraulic pressure in a torque phase that is started from when the transmission input shaft rotation speed has reached a rotation speed close to a synchronous rotation speed of a target speed position (intermediate speed position or required speed position) that is intended through the power-on downshift.

In performing the above-described multiple shifts that transitionally establish the intermediate speed position, not only the surge hydraulic pressure is supplied to the engaging frictional engagement element when the required speed position is established (required speed position engaging element) but also the surge hydraulic pressure is supplied to the engaging frictional engagement element when the intermediate speed position is transitionally established (intermediate speed position engaging element). At this time, if the hydraulic pressure that is supplied to the intermediate speed position engaging element is set so as to be equal to the hydraulic pressure that is supplied to the required speed position engaging element, the intermediate speed position engaging element can be completely engaged (complete clutch engagement) when the intermediate speed position is transitionally established. In this case, the state where the intermediate speed position is established is temporarily held, and the rate of change in input shaft rotation speed reduces (shift operation stagnates) in the middle of a change in rotation in a series of downshift control (downshift control from a speed position before the start of shifting to a required speed position). As a result, it is not possible to smoothly perform the multiple shifts, so it can lead to an extension of a shift time or deterioration of drivability.

In light of this point, the present embodiment is configured to be able to smoothly perform multiple shifts that transitionally establish an intermediate speed position in the case where the multiple shifts are performed.

Specifically, in the present embodiment, the surge hydraulic pressure for the engaging frictional engagement element (intermediate speed position engaging element) that is operated when the intermediate speed position is transitionally established is set so as to be lower than the surge hydraulic pressure for the engaging frictional engagement element (required speed position engaging element) that is operated when the required speed position is established. More specifically, when the intermediate speed position is transitionally established, the surge hydraulic pressure that is supplied from when the rotation speed of the input shaft 3a (transmission input shaft rotation speed) reaches a rotation speed close to the synchronous rotation speed of the intermediate speed position and a torque phase is started is set to a lower value. In this torque phase, the releasing frictional engagement element and the engaging frictional engagement element (intermediate speed position engaging element) that are operated when the intermediate speed position is transitionally established are respectively released and engaged. In addition, the surge hydraulic pressure that is supplied from when the transmission input shaft rotation speed reaches a rotation speed close to the synchronous rotation speed of the required speed position and a torque phase is started is set to a higher value (higher than the surge hydraulic pressure when the intermediate speed position is transitionally established). In this torque phase, the releasing frictional engagement element and the engaging frictional engagement element (required speed position engaging element) that are operated when the required speed position is established are respectively released and engaged.

The surge hydraulic pressure control is executed by the ECU 5. For this reason, in the ECU 5, a functional unit that executes the surge hydraulic pressure control is configured as a surge hydraulic pressure control unit according to the aspect of the disclosure.

Figure 5:
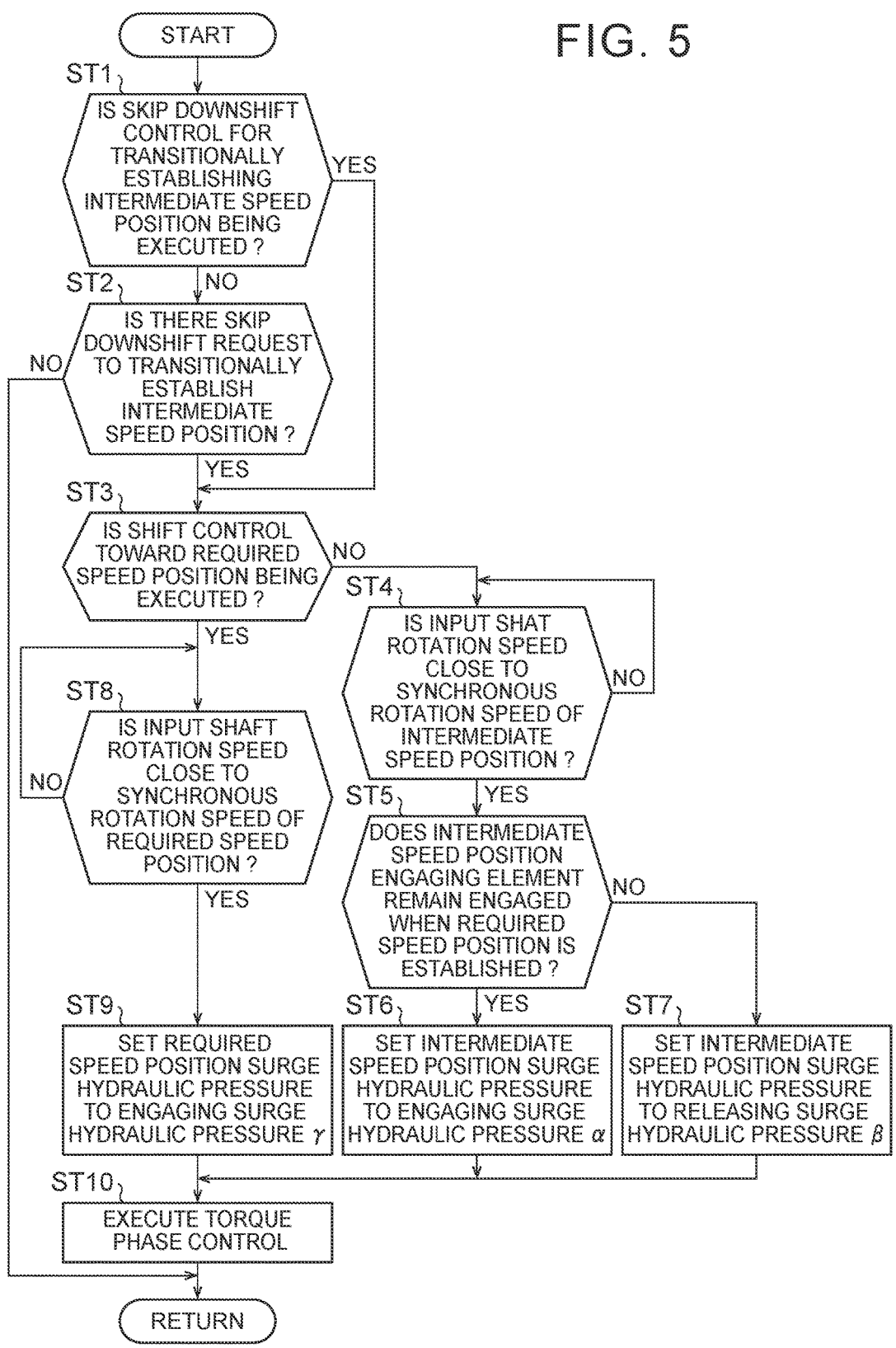
FIG. 5 is a flowchart for illustrating the procedure of surge hydraulic pressure control according to the embodiment.

Next, the procedure of the surge hydraulic pressure control according to the present embodiment will be described with reference to the flowchart of FIG. 5. This flowchart is repeatedly executed at predetermined time intervals after a start switch of the vehicle is operated to turn on.

Initially, in step ST1, it is determined whether skip downshift control for transitionally establishing an intermediate speed position is being executed. Since the skip downshift control has not been started yet at the time when the vehicle starts moving, negative determination is made in step ST1, and the process proceeds to step ST2.

In step ST2, it is determined whether there is a request to shift the automatic transmission 3 and the shift request is a skip downshift request to transitionally establish an intermediate speed position. That is, it is determined whether a required speed position that is set on the basis of the shift map is a lower gear-side speed position by two or more steps than the current speed position and requires to transitionally establish an intermediate speed position before the required speed position is established. Examples of the skip downshift request to transitionally establish an intermediate speed position include the case where, when an accelerator operation amount detected by the accelerator operation amount sensor 84 increases while traveling in the eighth speed position and a request to downshift from the eighth speed position to the third speed position is issued, the fifth speed position is set as the intermediate speed position.

Information as to whether it is required to transitionally establish an intermediate speed position and information about an intermediate speed position to be selected for each of combinations of a speed position before shifting and a speed position after shifting in skip downshift are prestored in the ROM as information that reflects the clutch heat generation amount, and the like (for example, such that the clutch heat generation amount does not exceed a predetermined allowable value) as described above. When a skip downshift request is issued, it is determined whether the skip downshift requires to transitionally establish an intermediate speed position by referencing the information stored in the ROM. When the skip downshift requires to transitionally establish an intermediate speed position, the intermediate speed position is set on the basis of a combination of a speed position before shifting and a speed position after shifting. Information as to whether it is required to transitionally establish an intermediate speed position and information about an intermediate speed position to be selected, which are stored in the ROM, may be set on the basis of a combination of a speed position before shifting and a speed position after shifting in the skip downshift and a vehicle speed (which corresponds to the output shaft rotation speed that is calculated on the basis of an output signal from the output shaft rotation speed sensor 83). For example, even when a combination of a speed position before shifting and a speed position after shifting is the same, but when the vehicle speed is higher than or equal to a predetermined value, it is determined that it is required to transitionally establish an intermediate speed position; whereas, when the vehicle speed is lower than the predetermined value, it is determined that it is not required to transitionally establish an intermediate speed position.

When there is no skip downshift request to transitionally establish an intermediate speed position, that is, when a request to shift the automatic transmission 3 is an upshift request, when there is a downshift request to change the speed position by one step, when there is a skip downshift request to make it possible to reduce the clutch heat generation amount even when an intermediate speed position is not transitionally established, or when there is no request to shift the automatic transmission 3, negative determination is made in step ST2, and the process is directly returned. In this case, when there is a shift request other than the skip downshift request to transitionally establish an intermediate speed position, a shift that conforms to the shift request is performed.

On the other hand, when there is a skip downshift request to transitionally establish an intermediate speed position and affirmative determination is made in step ST2, the process proceeds to step ST3. In step ST3, it is determined whether a target speed position in this shift is a required speed position (the last target speed position in the multiple shifts), that is, whether shift control toward the required speed position is currently being executed.

When the target speed position in this shift is the intermediate speed position and negative determination is made in step ST3, the process proceeds to step ST4. In step ST4, it is determined whether the input shaft rotation speed has reached a rotation speed close to the synchronous rotation speed of the intermediate speed position that is the current target speed position. That is, it is determined whether a shift from the speed position before the start of the shift toward the intermediate speed position has been started and then, as a result of the progress of the shift, the input shaft rotation speed has reached a rotation speed close to the synchronous rotation speed of the intermediate speed position. When a plurality of intermediate speed positions are transitionally established in a skip downshift to transitionally establish an intermediate speed position, it is determined whether the input shaft rotation speed has reached a rotation speed close to the synchronous rotation speed of a target speed position (an intermediate speed position set as the next target speed position) as a result of the progress of the shift at the time of shifting from the intermediate speed position to the next intermediate speed position (the intermediate speed position set as the next target speed position).

A determination operation in step ST4 specifically determines whether the input shaft rotation speed has reached a rotation speed within a predetermined deviation with respect to the synchronous rotation speed of the intermediate speed position. Since a downshift toward the intermediate speed position is being performed, it is determined whether the input shaft rotation speed is lower than the synchronous rotation speed of the intermediate speed position and the difference between the input shaft rotation speed and the synchronous rotation speed falls within the predetermined deviation. The deviation that is a threshold is set by experiment or simulation. This determination corresponds to a determination as to whether it is the timing at which a torque phase (torque phase in which the releasing frictional engagement element and the engaging frictional engagement element that are operated when the intermediate speed position is transitionally established are respectively released and engaged) is started in the intermediate speed position.

When the input shaft rotation speed has not reached a rotation speed close to the synchronous rotation speed of the intermediate speed position and negative determination is made in step ST4, the process waits until the shift further proceeds and the input shaft rotation speed reaches a rotation speed close to the synchronous rotation speed of the intermediate speed position.

On the other hand, when the input shaft rotation speed has reached a rotation speed close to the synchronous rotation speed of the intermediate speed position and affirmative determination is made in step ST4, the process proceeds to step ST5. In step ST5, it is determined whether the engaging frictional engagement element in the intermediate speed position (intermediate speed position engaging element) that is the current target speed position is the frictional engagement element that remains engaged when the required speed position is established. That is, it is determined whether the required speed position is established while the intermediate speed position engaging element remains engaged. This determination is carried out by acquiring information about the frictional engagement element to be engaged in the current target speed position (intermediate speed position) and the frictional engagement element to be engaged in the required speed position from the preset definition of the status of each frictional engagement element, which is required to establish each speed position.

For example, when the fifth speed position is set as the intermediate speed position at the time when there is a request to downshift from the eighth speed position to the third speed position, the intermediate speed position engaging element in the fifth speed position is the first clutch C1, and the first clutch C1 remains engaged in the third speed position. Therefore, in this case, affirmative determination is made in step ST5. In contrast, when the sixth speed position is set as the intermediate speed position at the time when there is a request to downshift from the eighth speed position to the fifth speed position, the intermediate speed position engaging element in the sixth speed position is the fourth clutch C4, and the fourth clutch C4 is released in the fifth speed position. Therefore, in this case, negative determination is made in step ST5.

When the intermediate speed position engaging element is engaged when the required speed position is established and affirmative determination is made in step ST5, the process proceeds to step ST6. In step ST6, an engaging surge hydraulic pressure $\alpha$ is set as the surge hydraulic pressure for the intermediate speed position engaging element. That is, the engaging surge hydraulic pressure $\alpha$ is set as the surge hydraulic pressure at the start of the torque phase. The engaging surge hydraulic pressure $\alpha$ is set by experiment or simulation to such a relatively small value that does not lead to a situation in which shift operation stagnates as a result of a decrease in the rate of change in input shaft rotation speed when the intermediate speed position is transitionally established.

After the surge hydraulic pressure is set to the engaging surge hydraulic pressure $\alpha$ in this way, the process proceeds to step ST10. In step ST10, torque phase control in which supplied hydraulic pressure is increased by the engaging surge hydraulic pressure $\alpha$ is executed. At this time, since the engaging surge hydraulic pressure $\alpha$ is set to a relatively small value as described above, it is possible to prevent the intermediate speed position engaging element from being early completely engaged (completing clutch engagement) when the intermediate speed position is transitionally established.

On the other hand, when the intermediate speed position engaging element is not engaged when the required speed position is established (the intermediate speed position engaging element is released when the required speed position is established) and negative determination is made in step ST5, the process proceeds to step ST7. In step ST7, a releasing surge hydraulic pressure $\beta$ is set as the surge hydraulic pressure for the intermediate speed position engaging element. That is, the releasing surge hydraulic pressure $\beta$ is set as the surge hydraulic pressure at the start of the torque phase. This releasing surge hydraulic pressure $\beta$ is also set by experiment or simulation to such a relatively small value that does not lead to a situation in which shift operation stagnates as a result of a decrease in the rate of change in input shaft rotation speed when the intermediate speed position is transitionally established. For example, this releasing surge hydraulic pressure $\beta$ is set to a value slightly lower than the engaging surge hydraulic pressure $\alpha$. In this case, the releasing surge hydraulic pressure $\beta$ may be calculated by multiplying the engaging surge hydraulic pressure $\alpha$ by a predetermined correction coefficient (correction coefficient smaller than 1). These engaging surge hydraulic pressure $\alpha$ and releasing surge hydraulic pressure $\beta$ may be the same value.

After the surge hydraulic pressure is set to the releasing surge hydraulic pressure $\beta$ in this way, the process proceeds to step ST10. In step ST10, torque phase control in which supplied hydraulic pressure is increased by the releasing surge hydraulic pressure is executed. At this time, since the releasing surge hydraulic pressure $\beta$ is also set to a relatively small value as described above, it is possible to prevent the intermediate speed position engaging element from being early completely engaged (completing clutch engagement) when the intermediate speed position is transitionally established.

After torque phase control is executed and the intermediate speed position is transitionally established in this way, it is determined in step ST1 of the next routine that skip downshift control for transitionally establishing an intermediate speed position is currently being executed (for example, it is determined that downshift control toward a required speed position after an intermediate speed position is transitionally established is being executed, that is, affirmative determination is made), after which the process proceeds to step ST3.

In this case, in step ST3, since the target speed position in this shift is the required speed position, affirmative determination is made, after which the process proceeds to step ST8. When a plurality of intermediate speed positions are transitionally established as described above and the target speed position in this shift is also an intermediate speed position (the second or later intermediate speed position), negative determination is made in step ST3, and the operation from step ST4 is repeated.

In step ST8, it is determined whether the input shaft rotation speed has reached a rotation speed close to the synchronous rotation speed of the required speed position that is a current target speed position. That is, it is determined whether a shift from the intermediate speed position toward the required speed position is started and the input shaft rotation speed has reached a rotation speed close to the synchronous rotation speed of the required speed position as a result of the progress of the shift.

Specifically, it is determined whether the input shaft rotation speed has reached a rotation speed that falls within the predetermined deviation with respect to the synchronous rotation speed of the required speed position. Since a downshift toward the required speed position is being performed, it is determined whether the input shaft rotation speed is lower than the synchronous rotation speed of the required speed position and the difference between the input shaft rotation speed and the synchronous rotation speed has reached a value that falls within the predetermined deviation. The deviation that is a threshold is set by experiment or simulation. This determination corresponds to a determination as to whether it is the timing at which a torque phase (torque phase in which the releasing frictional engagement element and the engaging frictional engagement element that are operated when the required speed position is established are respectively released and engaged) is started in the required speed position.

When the input shaft rotation speed has not reached a rotation speed close to the synchronous rotation speed of the required speed position and negative determination is made in step ST8, the process waits until the shift further proceeds and the input shaft rotation speed reaches a rotation speed close to the synchronous rotation speed of the required speed position.

On the other hand, when the input shaft rotation speed reaches a rotation speed close to the synchronous rotation speed of the required speed position and affirmative determination is made in step ST8, the process proceeds to step ST9. In step ST9, an engaging surge hydraulic pressure $\gamma$ is set as the surge hydraulic pressure for the required speed position engaging element. That is, the engaging surge hydraulic pressure $\gamma$ is set as the surge hydraulic pressure at the start of the torque phase. This engaging surge hydraulic pressure $\gamma$ is set by experiment or simulation to such a relatively large value (a value larger than the engaging surge hydraulic pressure $\alpha$ or the releasing surge hydraulic pressure $\beta$) that, when the required speed position is established, increases the response of the required speed position engaging element and that makes it possible to early completely engage the required speed position engaging element (complete clutch engagement) when the required speed position is established.

After the surge hydraulic pressure is set to the engaging surge hydraulic pressure $\gamma$ in this way, the process proceeds to step ST10. In step ST10, torque phase control in which supplied hydraulic pressure is increased by the engaging surge hydraulic pressure $\gamma$ is executed. At this time, since the engaging surge hydraulic pressure $\gamma$ is set to a relatively large value as described above, it is possible to prevent the input shaft rotation speed from becoming higher than the synchronous rotation speed of the required speed position (racing of the input shaft rotation speed) when the required speed position engaging element is early completely engaged (complete clutch engagement) when the required speed position is established.

In this way, after torque phase control at the time when the required speed position is established is executed, the current skip downshift control for transitionally establishing an intermediate speed position ends. In this case, in the next routine, negative determination is made in both step ST1 and step ST2, and the process is returned.

The operations of the above-described step ST6, step ST7 and step ST9 correspond to operations that are executed by the surge hydraulic pressure control unit according to the aspect of the disclosure, and correspond to operations to set a surge hydraulic pressure for an engaging frictional engagement element that is operated when an intermediate speed position is transitionally established such that the surge hydraulic pressure for the engaging frictional engagement element that is operated when an intermediate speed position is transitionally established is lower than a surge hydraulic pressure for an engaging frictional engagement element that is operated when a required speed position is established.

The above operations are repeated at predetermined time intervals.

Figure 6:
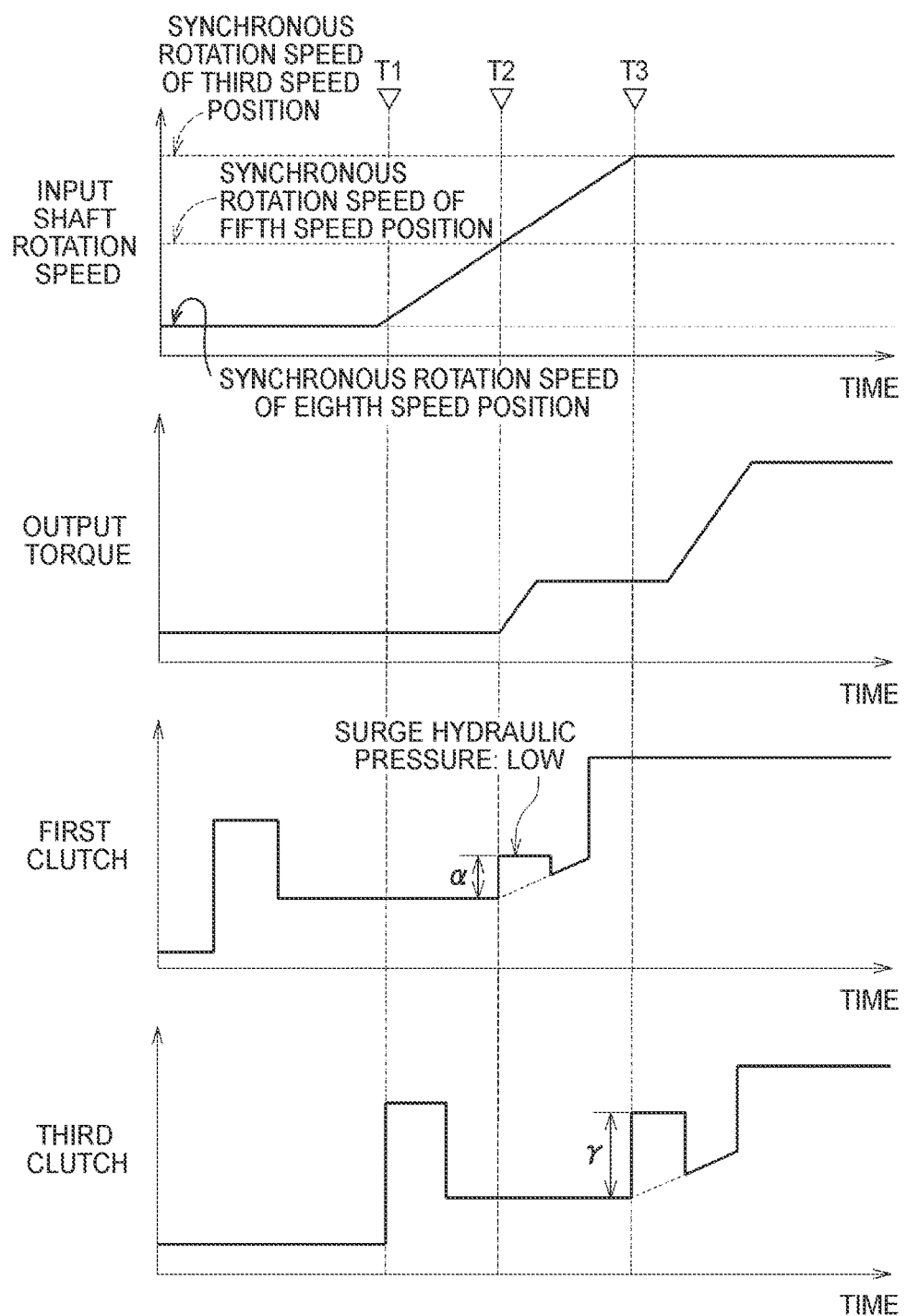
FIG. 6 is a timing chart that shows changes in input shaft rotation speed, changes in output torque and changes in hydraulic pressure command value of each of frictional engagement elements in the case where the engaging frictional engagement element that is operated when an intermediate speed position is transitionally established remains engaged when a required speed position is established in the embodiment.

FIG. 6 is a timing chart that shows changes in input shaft rotation speed, changes in output torque and changes in hydraulic pressure command value of each of frictional engagement elements in the case where an engaging frictional engagement element (intermediate speed position engaging element) remains engaged when a required speed position is established in the above-described embodiment.

Figure 7:
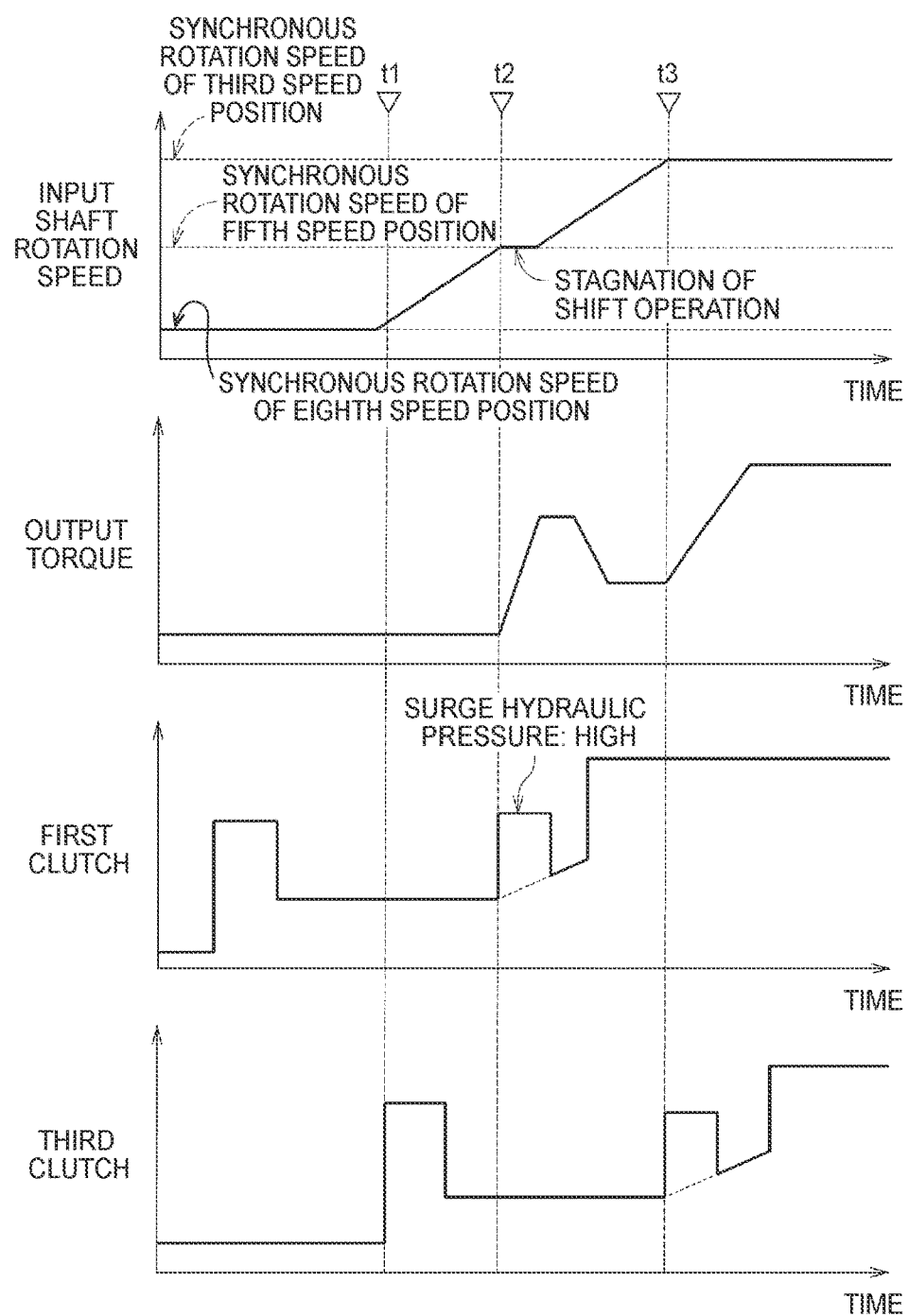
FIG. 7 is a timing chart that shows changes in input shaft rotation speed, changes in output torque and changes in hydraulic pressure command value of each of frictional engagement elements in the case where the engaging frictional engagement element that is operated when an intermediate speed position is transitionally established remains engaged when a required speed position is established in the related art.

FIG. 7 is a timing chart that shows changes in input shaft rotation speed, changes in output torque and changes in hydraulic pressure command value of each of frictional engagement elements in the case where an engaging frictional engagement element (intermediate speed position engaging element) that is operated when an intermediate speed position is transitionally established remains engaged when a required speed position is established in the related art (surge hydraulic pressure for the intermediate speed position engaging element and surge hydraulic pressure for a required speed position engaging element are the same).

FIG. 6 and FIG. 7 each show the case where a skip downshift from the eighth speed position to the third speed position via the fifth speed position that is set as the intermediate speed position is performed.

Time T1 in FIG. 6 and time t1 in FIG. 7 each are inertia phase start timing of the shift toward the intermediate speed position. With the start of the inertia phase, the hydraulic pressure command value (not shown in the drawings) of the first brake B1 is gradually decreased, and the input shaft rotation speed increases toward the synchronous rotation speed of the fifth speed position. When the input shaft rotation speed has reached a rotation speed close to the synchronous rotation speed of the fifth speed position (time T2 in FIG. 6 and time t2 in FIG. 7; at the start of the torque phase), supply of the surge hydraulic pressure is started.

In the related art (FIG. 7), since the surge hydraulic pressure (surge hydraulic pressure that is supplied to the first clutch C1) at the start of the torque phase is set to a higher value, the intermediate speed position engaging element (first clutch C1) is completely engaged (completes clutch engagement) when the intermediate speed position is transitionally established, the state where the intermediate speed position (fifth speed position) is established is temporarily held, and the rate of change in input shaft rotation speed decreases (shift operation stagnates) in the middle of a change in rotation in a series of downshift control (downshift control from the speed position before the start of the shift (eighth speed position) to the required speed position (third speed position)). That is, it is not possible to smoothly perform multiple shifts, which leads to an extension of a shift time. In addition, inertia torque is output as output torque as the input shaft rotation speed stagnates, which leads to deterioration of drivability due to fluctuations in driving force. Time t3 in FIG. 7 is the time at which the input shaft rotation speed has reached a rotation speed close to the synchronous rotation speed of the required speed position (third speed position), and is the time at which the torque phase starts in the required speed position.

In contrast, in the present embodiment (FIG. 6), since the surge hydraulic pressure (surge hydraulic pressure that is supplied to the first clutch C1) at the start of the torque phase (time T2) is set to a lower value (the surge hydraulic pressure is set to the engaging surge hydraulic pressure $\alpha$), it is possible to prevent the intermediate speed position engaging element (first clutch C1) from being early completely engaged (completing clutch engagement) when the intermediate speed position is transitionally established. Therefore, it is possible to suppress a reduction in the rate of change in input shaft rotation speed (stagnation of shift operation) in the middle of a change in rotation in a series of downshift control (downshift control from the speed position before the start of the shift (current speed position; eighth speed position) to the required speed position (third speed position)). As a result, it is possible to smoothly perform multiple shifts that transitionally establish an intermediate speed position, so it is possible to prevent an extension of a shift time. In addition, it is possible to suppress fluctuations in driving force resulting from stagnation of the input shaft rotation speed, so it is also possible to suppress deterioration of drivability. As the input shaft rotation speed reaches a rotation speed close to the synchronous rotation speed of the required speed position (third speed position) at time T3 in FIG. 6, the torque phase in the required speed position (third speed position) is started. Since the surge hydraulic pressure for the engaging frictional engagement element (third clutch C3) that is operated when the required speed position is established is set to a higher value (the surge hydraulic pressure is set to the engaging surge hydraulic pressure $\gamma$), the response of the engaging frictional engagement element (third clutch C3) at this time is increased. Therefore, the engaging frictional engagement element (third clutch C3) is early completely engaged (completes clutch engagement) when the required speed position (third speed position) is established. For this reason, it is possible to prevent the input shaft rotation speed from becoming higher than the synchronous rotation speed of the required speed position (racing of the input shaft rotation speed).

Figure 8:
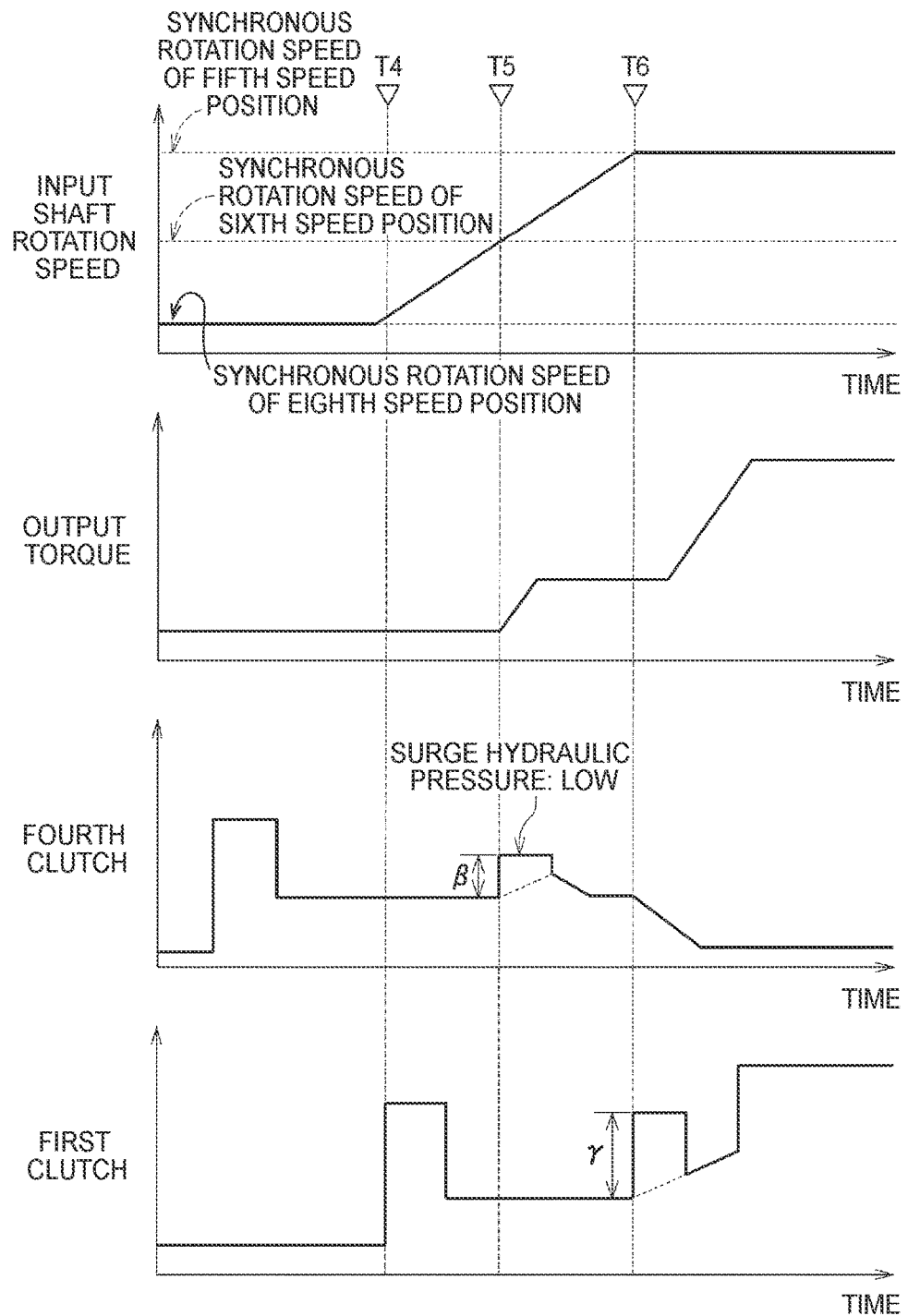
FIG. 8 is a timing chart that shows changes in input shaft rotation speed, changes in output torque and changes in hydraulic pressure command value of each of frictional engagement elements in the case where the engaging frictional engagement element that is operated when an intermediate speed position is transitionally established is released when a required speed position is established in the embodiment.

FIG. 8 is a timing chart that shows changes in input shaft rotation speed, changes in output torque and changes in hydraulic pressure command value of each of frictional engagement elements in the case where an engaging frictional engagement element that is operated when an intermediate speed position is transitionally established (intermediate speed position engaging element) is released when a required speed position is established in the above-described embodiment. FIG. 8 shows the case where a skip downshift from the eighth speed position to the fifth speed position via the sixth speed position that is set as the intermediate speed position is performed. Time T4 in FIG. 8 is the time at which an inertia phase starts in the shift toward the intermediate speed position. Time T5 is the time at which the input shaft rotation speed reaches a rotation speed close to the synchronous rotation speed of the sixth speed position and the torque phase starts in the sixth speed position.

In FIG. 8, since the surge hydraulic pressure (surge hydraulic pressure that is supplied to the fourth clutch C4) at the start of the torque phase is set to a lower value (the surge hydraulic pressure is set to the releasing surge hydraulic pressure $\beta$), it is possible to prevent the intermediate speed position engaging element (fourth clutch C4) from being completely engaged (completing clutch engagement) when the intermediate speed position is transitionally established. Therefore, it is possible to prevent a reduction in the rate of change in input shaft rotation speed (stagnation of shift operation) in the middle of a change in rotation in a series of downshift control (downshift control from the speed position before the start of the shift (current speed position; eighth speed position) to the required speed position (fifth speed position)). As a result, it is possible to smoothly perform multiple shifts that transitionally establish an intermediate speed position, so it is possible to prevent an extension of a shift time. In addition, it is possible to suppress fluctuations in driving force resulting from stagnation of the input shaft rotation speed, so it is also possible to suppress deterioration of drivability. As the input shaft rotation speed reaches a rotation speed close to the synchronous rotation speed of the required speed position (fifth speed position) at time T6 in FIG. 8, the torque phase in the required speed position is started. Since the surge hydraulic pressure for the engaging frictional engagement element (first clutch C1) that is operated when the required speed position is established is set to a higher value (the surge hydraulic pressure is set to the engaging surge hydraulic pressure $\gamma$), the response of the engaging frictional engagement element (first clutch C1) at this time is increased. Therefore, the engaging frictional engagement element (first clutch C1) is early completely engaged (completes clutch engagement) when the required speed position (fifth speed position) is established. For this reason, it is possible to prevent the input shaft rotation speed from becoming higher than the synchronous rotation speed of the required speed position (racing of the input shaft rotation speed).

As described above, in the present embodiment, at the time when a power-on downshift that performs multiple shifts that transitionally establish an intermediate speed position is performed, the surge hydraulic pressure for the engaging frictional engagement element that is operated when the intermediate speed position is transitionally established is set so as to be lower than the surge hydraulic pressure for the engaging frictional engagement element that is operated when the required speed position is established. Thus, it is possible to prevent the engaging frictional engagement element that is operated when the intermediate speed position is transitionally established from being completely engaged (completing clutch engagement). Therefore, it is possible to prevent a reduction in the rate of change in input shaft rotation speed (stagnation of shift operation) in the middle of a change in rotation in a series of downshift control (downshift control from the speed position before the start of the shift (current speed position) to the required speed position). As a result, it is possible to smoothly perform multiple shifts that transitionally establish an intermediate speed position, so it is possible to prevent an extension of a shift time. In addition, it is possible to suppress fluctuations in driving force resulting from stagnation of the input shaft rotation speed, so it is also possible to suppress deterioration of drivability. On the other hand, since the surge hydraulic pressure for the engaging frictional engagement element that is operated when the required speed position is established is set to a higher value, the response of the engaging frictional engagement element at this time is increased. Therefore, the engaging frictional engagement element is early completely engaged (completes clutch engagement) when the required speed position is established. For this reason, it is possible to prevent the input shaft rotation speed from becoming higher than the synchronous rotation speed of the required speed position (racing of the input shaft rotation speed).

The embodiment described above is illustrative and not restrictive in all respects. Therefore, the technical scope of the disclosure should not be interpreted from only the above-described embodiment but be defined on the basis of the appended claims. The technical scope of the disclosure encompasses the appended claims, equivalents thereof and all the modifications within the scope of the disclosure.

For example, in the above-described embodiment, an example in which the vehicle 100 is an FF vehicle is described; however, the vehicle is not limited to the FF vehicle. The vehicle may be a front-engine rear-drive (FR) vehicle or a four-wheel drive vehicle.

A mode of skip downshift for transitionally establishing an intermediate speed position according to the aspect of the disclosure broadly includes an overlap shift for successively performing a single downshift (step-by-step downshift).

A required speed position (final target speed position) according to the aspects of the disclosure may be an optimal speed position obtained on the basis of a shift point or an achievable speed position obtained in consideration of failure state, heat generation amount, over revolution, and the like, in addition to the optimal speed position. At this time, the intermediate speed position may be a speed position that is obtained from the frictional engagement elements that complete engagement in current shift control.

Control over the surge hydraulic pressure according to the aspects of the disclosure is executable in any one of the case where input change is performed and the case where input change is not performed. The input change means the case where, when the first clutch C1 and the second clutch C2 each are an engagement holding element (input clutch that is able to transmit power from the engine 1 to the second transmission unit 32 of the automatic transmission 3), the engagement holding element is changed.

The aspects of the disclosure are usable for a controller that is applied to a stepped automatic transmission that is mounted on a vehicle and that is able to perform a skip shift via an intermediate speed position.

What is claimed is:

1. A controller for a stepped automatic transmission, the stepped automatic transmission being configured to
   establish one of a plurality of speed positions by selectively engaging a plurality of frictional engagement elements and,
   when a power-on downshift is required and when there is a difference in speed position by two or more steps between a current speed position and a required speed position that is required in response to an operation status, perform multiple shifts that transitionally establish an intermediate speed position between the current speed position and the required speed position, the controller comprising
   an electronic control unit configured to
      at the time when a power-on downshift that performs the multiple shifts that transitionally establish an intermediate speed position is performed, control a surge hydraulic pressure that is supplied to each engaging frictional engagement element in order to increase response of the engaging frictional engagement element, each engaging frictional engagement element being controlled from a released state toward an engaged state in a corresponding one of the shifts, and
      set a surge hydraulic pressure for the engaging frictional engagement element that is operated when the intermediate speed position is transitionally established such that the surge hydraulic pressure for the engaging frictional engagement element that is operated when the intermediate speed position is transitionally established is lower than a surge hydraulic pressure for the engaging frictional engagement element that is operated when the required speed position is established.

2. The controller according to claim 1, wherein
the electronic control unit is configured to
   when the intermediate speed position is transitionally established, start supplying the surge hydraulic pressure at the time when a transmission input shaft rotation speed reaches a rotation speed close to a synchronous rotation speed of the intermediate speed position and a torque phase is started, the torque phase is a phase in which a releasing frictional engagement element and the engaging frictional engagement element that are operated when the intermediate speed position is transitionally established are respectively released and engaged, and
   when the required speed position is established, start supplying the surge hydraulic pressure at the time when the transmission input shaft rotation speed reaches a rotation speed close to a synchronous rotation speed of the required speed position and a torque phase is started, the torque phase is a phase in which a releasing frictional engagement element and the engaging frictional engagement element that are operated when the required speed position is established are respectively released and engaged.

3. The controller according to claim 1, wherein
the electronic control unit is configured to
   when the engaging frictional engagement element that is operated when the intermediate speed position is transitionally established remains engaged in a target speed position subsequent to the intermediate speed position, set an engaging surge hydraulic pressure as the surge hydraulic pressure for the engaging frictional engagement element that is operated when the intermediate speed position is transitionally established, and
   when the engaging frictional engagement element that is operated when the intermediate speed position is transitionally established is released in a target speed position subsequent to the intermediate speed position, set a releasing surge hydraulic pressure that is different from the engaging surge hydraulic pressure as the surge hydraulic pressure for the engaging frictional engagement element that is operated when the intermediate speed position is transitionally established.

4. The controller according to claim 3, wherein
the releasing surge hydraulic pressure is lower than the engaging surge hydraulic pressure.

5. The controller according to claim 1, wherein
the electronic control unit is configured to
   when the engaging frictional engagement element that is operated when the intermediate speed position is transitionally established remains engaged in a target speed position subsequent to the intermediate speed position, set an engaging surge hydraulic pressure as the surge hydraulic pressure for the engaging frictional engagement element that is operated when the intermediate speed position is transitionally established, and when the engaging frictional engagement element that is operated when the intermediate speed position is transitionally established is released in a target speed position subsequent to the intermediate speed position, set a releasing surge hydraulic pressure that is equal to the engaging surge hydraulic pressure as the surge hydraulic pressure for the engaging frictional engagement element that is operated when the intermediate speed position is transitionally established.

* * * * *